(12) United States Patent
Hosokawa et al.

(10) Patent No.: US 12,539,851 B2
(45) Date of Patent: Feb. 3, 2026

(54) VEHICLE

(71) Applicant: HONDA MOTOR CO., LTD., Tokyo (JP)

(72) Inventors: Ko Hosokawa, Tokyo (JP); Masato Nakata, Tokyo (JP); Akihiko Tomoda, Tokyo (JP); Shunichi Nakabayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 18/039,732

(22) PCT Filed: Nov. 2, 2021

(86) PCT No.: PCT/JP2021/040446
§ 371 (c)(1),
(2) Date: Jun. 1, 2023

(87) PCT Pub. No.: WO2022/137819
PCT Pub. Date: Jun. 30, 2022

(65) Prior Publication Data
US 2024/0025401 A1    Jan. 25, 2024

(30) Foreign Application Priority Data
Dec. 24, 2020   (JP) ................... 2020-214794

(51) Int. Cl.
*B60W 10/20*    (2006.01)
*B60W 30/12*    (2020.01)
*B60W 40/114*   (2012.01)

(52) U.S. Cl.
CPC ............ *B60W 30/12* (2013.01); *B60W 10/20* (2013.01); *B60W 40/114* (2013.01); *B60W 2300/36* (2013.01); *B60W 2520/14* (2013.01)

(58) Field of Classification Search
CPC ......... B60W 2300/36; B60W 2520/14; B60W 10/20; B60W 30/12; B60W 40/114;
(Continued)

(56) References Cited

U.S. PATENT DOCUMENTS

| | | |
|---|---|---|
| 2017/0206787 A1 | 7/2017 | Ando |
| 2018/0204077 A1 | 7/2018 | Yamanoi et al. |

(Continued)

FOREIGN PATENT DOCUMENTS

| | | |
|---|---|---|
| JP | 2003-121543 | 4/2003 |
| JP | 2004-243783 | 9/2004 |

(Continued)

OTHER PUBLICATIONS

International Search Report and Written Opinion for International Application No. PCT/JP2021/040446 mailed on Jan. 18, 2022, 11 pages.

*Primary Examiner* — Charles J Han
(74) *Attorney, Agent, or Firm* — Amin, Turocy & Watson, LLP

(57) ABSTRACT

This vehicle includes a lane keeping assistance system and a control device which controls steering of the vehicle, wherein the control device divides a width of a lane in which the vehicle travels into a plurality of virtual lanes and controls the vehicle so that the vehicle travels in one virtual lane among the plurality of virtual lanes. The control device controls the vehicle so that a traveling position of the vehicle is returned to an inside of the one virtual lane when the vehicle traveling in the one virtual lane is about to deviate from the inside of the one virtual lane.

4 Claims, 14 Drawing Sheets

(58) Field of Classification Search
CPC .... B60Y 2200/12; B62D 15/025; B62J 27/00; B62J 45/20
See application file for complete search history.

(56) References Cited

U.S. PATENT DOCUMENTS

| | | | |
|---|---|---|---|
| 2019/0315348 A1* | 10/2019 | Mimura | B60W 30/09 |
| 2020/0211399 A1 | 7/2020 | Zhang et al. | |
| 2020/0278684 A1* | 9/2020 | Naserian | G05D 1/0221 |
| 2022/0169273 A1* | 6/2022 | Horn | B62J 27/00 |

FOREIGN PATENT DOCUMENTS

| | | | |
|---|---|---|---|
| JP | 2009-176188 | 8/2009 | |
| JP | 2009176188 A * | 8/2009 | |
| JP | 2015-041242 | 3/2015 | |
| JP | 5958257 | 7/2016 | |
| JP | 2017-126219 | 7/2017 | |
| WO | 2017/009934 | 1/2017 | |
| WO | 2020/041191 | 2/2020 | |
| WO | WO-2020041191 A1 * | 2/2020 | B60W 50/14 |

\* cited by examiner

FIG. 8
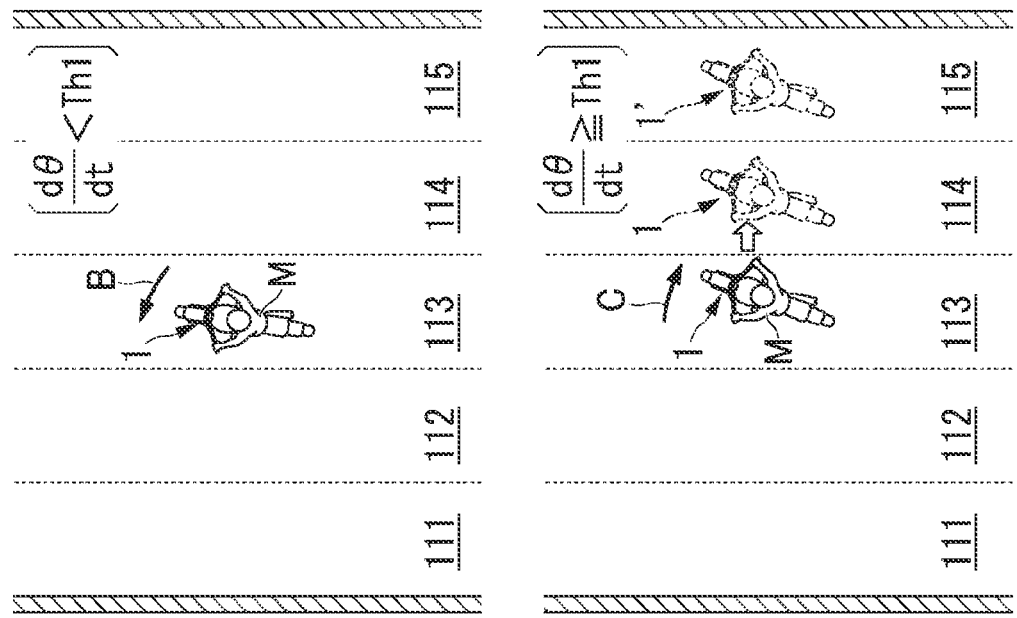
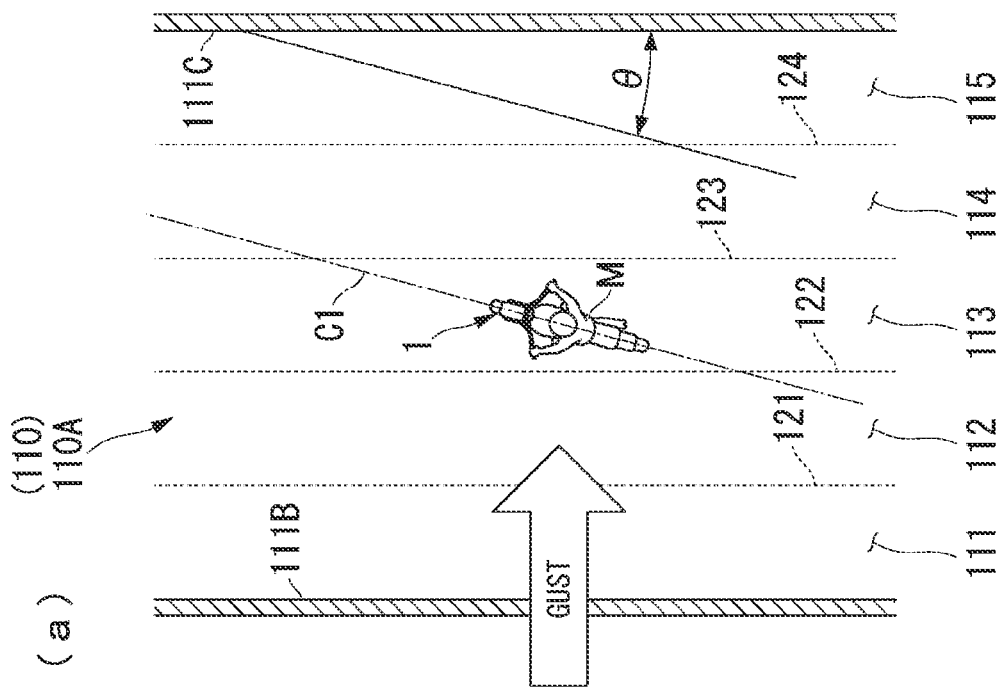

FIG. 11
(a)
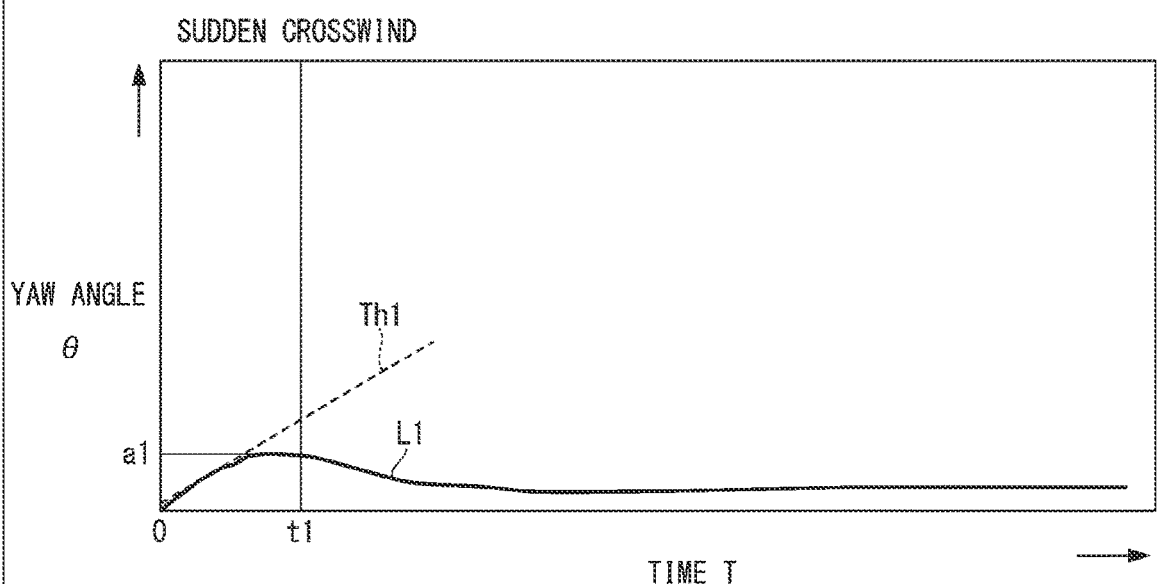
(b)
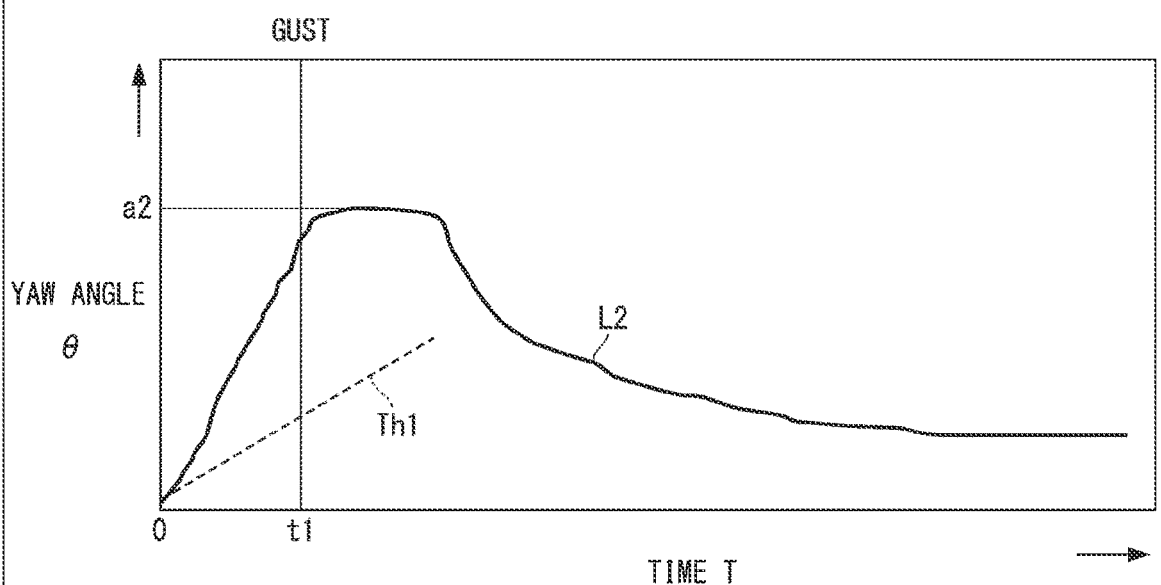

FIG. 12
(a)
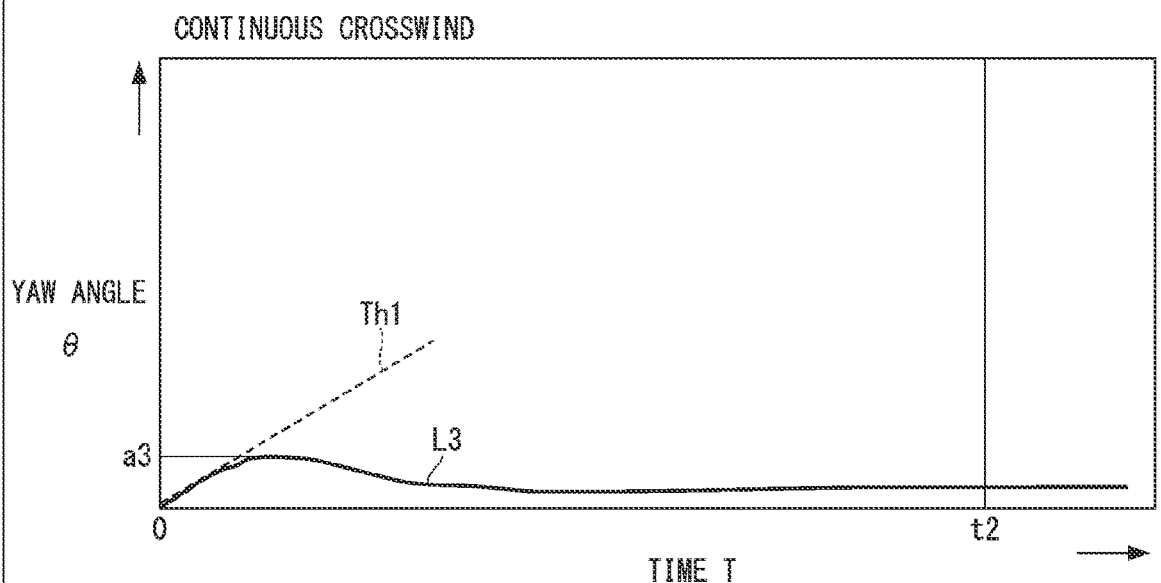
(b)
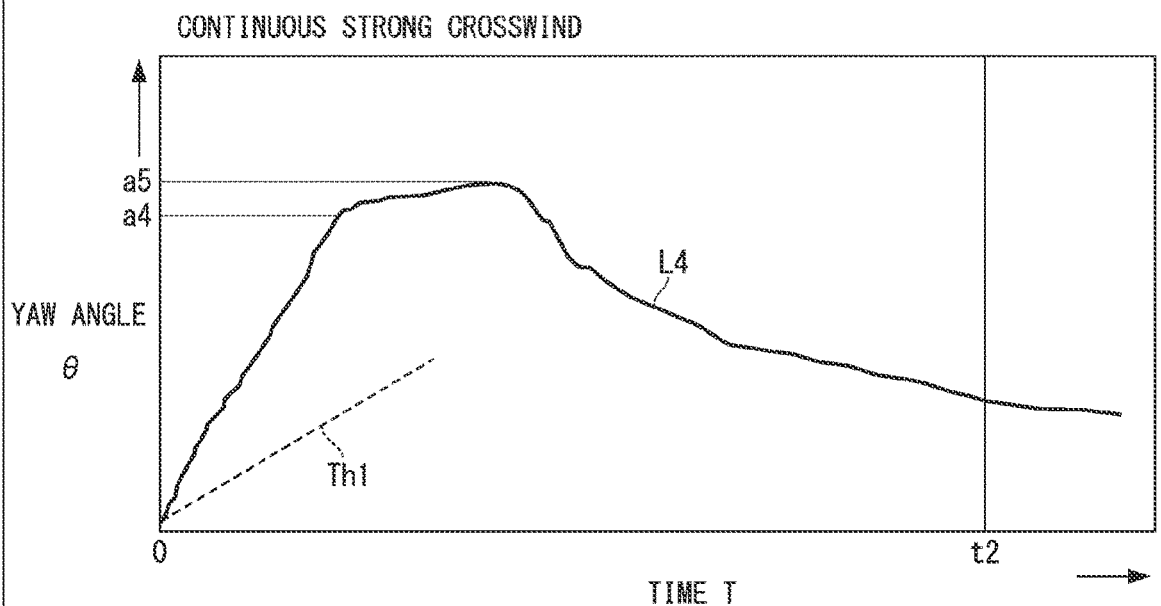

VEHICLE

TECHNICAL FIELD

The present invention relates to a vehicle.

The present application claims priority based on Japanese Patent Application No. 2020-214794 filed on Dec. 24, 2020, the contents of which are incorporated herein by reference.

BACKGROUND ART

Conventionally, there is known a technology that enables a vehicle including a lane keeping assistance system to keep traveling along a lane even when the vehicle receives a strong crosswind in a traveling state (for example, see Patent Document 1).

RELATED ART DOCUMENT

Patent Document

Patent Document 1: Japanese Patent No. 5958257

SUMMARY

Problems to be Solved by the Invention

In the conventional technology described above, when the vehicle receives a strong lateral disturbance such as gust, the vehicle can perform steering control to counteract the disturbance. However, in this case, a driver may behave unnaturally.

Here, an object of the present invention is to suppress the occurrence of unnatural behavior in a vehicle including a lane keeping assistance system.

Means for Solving the Problem

As a solution to the above problems, the present invention provides a vehicle including: a lane keeping assistance system; and a control device controlling steering of the vehicle. The control device divides a width of a lane (110A) in which the vehicle travels into a plurality of virtual lanes. The control device controls the vehicle so that the vehicle travels in one virtual lane among the plurality of virtual lanes.

According to this configuration, in the vehicle including the lane keeping assistance system, a plurality of virtual lanes are divided in the width of the lane, and the vehicle is controlled to travel in one of these virtual lanes. Accordingly, even when the vehicle receives sudden disturbance, the vehicle can keep traveling in the same lane while allowing the movement in the divided virtual lane. Accordingly, it is possible to suppress unnatural behavior from being given to the driver while keeping the straightness of the vehicle.

In the present invention, the control device may perform the following control when the vehicle traveling in the one virtual lane is about to deviate from the inside of the one virtual lane. That is, the control device may control the vehicle so that a traveling position of the vehicle is returned to an inside of the one virtual lane.

According to this configuration, when the traveling vehicle is about to deviate from the one virtual lane, the traveling position is controlled to be returned to the inside of the one virtual lane. Accordingly, it is possible to keep the traveling in the divided virtual lane and to keep the straightness of the vehicle.

In the present invention, a width of each of the plurality of virtual lanes may be set to be uniform.

According to this configuration, the width of each of the plurality of virtual lanes is set to be uniform. Accordingly, the driver can easily recognize the position of each virtual lane.

In the present invention, the control device may perform the following control when the vehicle traveling in the one virtual lane changes a yaw angle with respect to a forward direction along the lane. That is, the control device may control the vehicle so that a change in the yaw angle decreases.

According to this configuration, for example, when the yaw angle with respect to the forward direction along the lane increases, this yaw angle is controlled to decrease. Accordingly, it is possible to keep the straightness of the vehicle by the feedback according to a change in the yaw angle.

In the present invention, the control device may perform the following control when a change speed of the yaw angle exceeds a first threshold. That is, the control device may control the vehicle so that a lane is changed to a virtual lane adjacent to a change side of the yaw angle with respect to the traveling virtual lane.

According to this configuration, when a change speed of the yaw angle exceeds the first threshold due to the influence of disturbance in a traveling state, a lane is allowed to be changed to the virtual lane adjacent to the traveling virtual lane. Accordingly, it is possible to control the vehicle to compensate for strong disturbance and to suppress the occurrence of unnatural behavior.

In the present invention, the control device may perform the following control when the change speed of the yaw angle exceeds a second threshold larger than the first threshold. That is, the control device may control the vehicle so that a lane is changed to a second virtual lane adjacent to the change side of the yaw angle with respect to the traveling virtual lane.

According to this configuration, when the change speed of the yaw angle exceeds the second threshold larger than the first threshold, a lane is allowed to be changed to the second virtual lane adjacent to the traveling virtual lane. Accordingly, it is possible to control the vehicle according to the strength of disturbance and to further suppress the occurrence of unnatural behavior.

In the present invention, the control device may perform the following control when the vehicle travels in the virtual lanes at the outermost end among the plurality of virtual lanes. That is, the control device may control the vehicle so that a lane is not changed regardless of the change speed of the yaw angle.

According to this configuration, when the vehicle travels in the virtual lane at the outermost end among the plurality of virtual lanes, the vehicle is controlled such that a lane change is not allowed even when the change speed of the yaw angle exceeds the first threshold. Accordingly, it is possible to keep the traveling of the vehicle in the same lane.

In the present invention, the control device may perform the following control if the other vehicle travels within a predetermined distance behind an adjacent virtual lane as a lane change target when attempting to cause the vehicle to change a lane from the one virtual lane to the adjacent virtual lane. That is, the control device may control the vehicle so that a lane is not changed regardless of the change speed of the yaw angle.

According to this configuration, if the other vehicle travels within a predetermined distance behind the adjacent virtual lane as a lane change target when attempting to cause the vehicle to change a lane from one virtual lane to the adjacent virtual lane, the following control is performed. That is, the vehicle is controlled such that a lane change is not allowed even when the change speed of the yaw angle exceeds the first threshold. Accordingly, it is possible to keep the traveling of the vehicle in the same lane.

Advantage of the Invention

According to the present invention, it is possible to suppress the occurrence of unnatural behavior in the vehicle including the lane keeping assistance system.

BRIEF DESCRIPTION OF THE DRAWINGS

FIG. 8 is an explanatory diagram showing a pattern according to a change speed of a yaw angle in the yaw angle feedback control.

FIG. 11 is a graph showing a change in the yaw angle over time during gusts.

FIG. 12 is a graph showing a change in the yaw angle over time during continuous crosswind.

DESCRIPTION OF THE EMBODIMENTS

Figure 1:
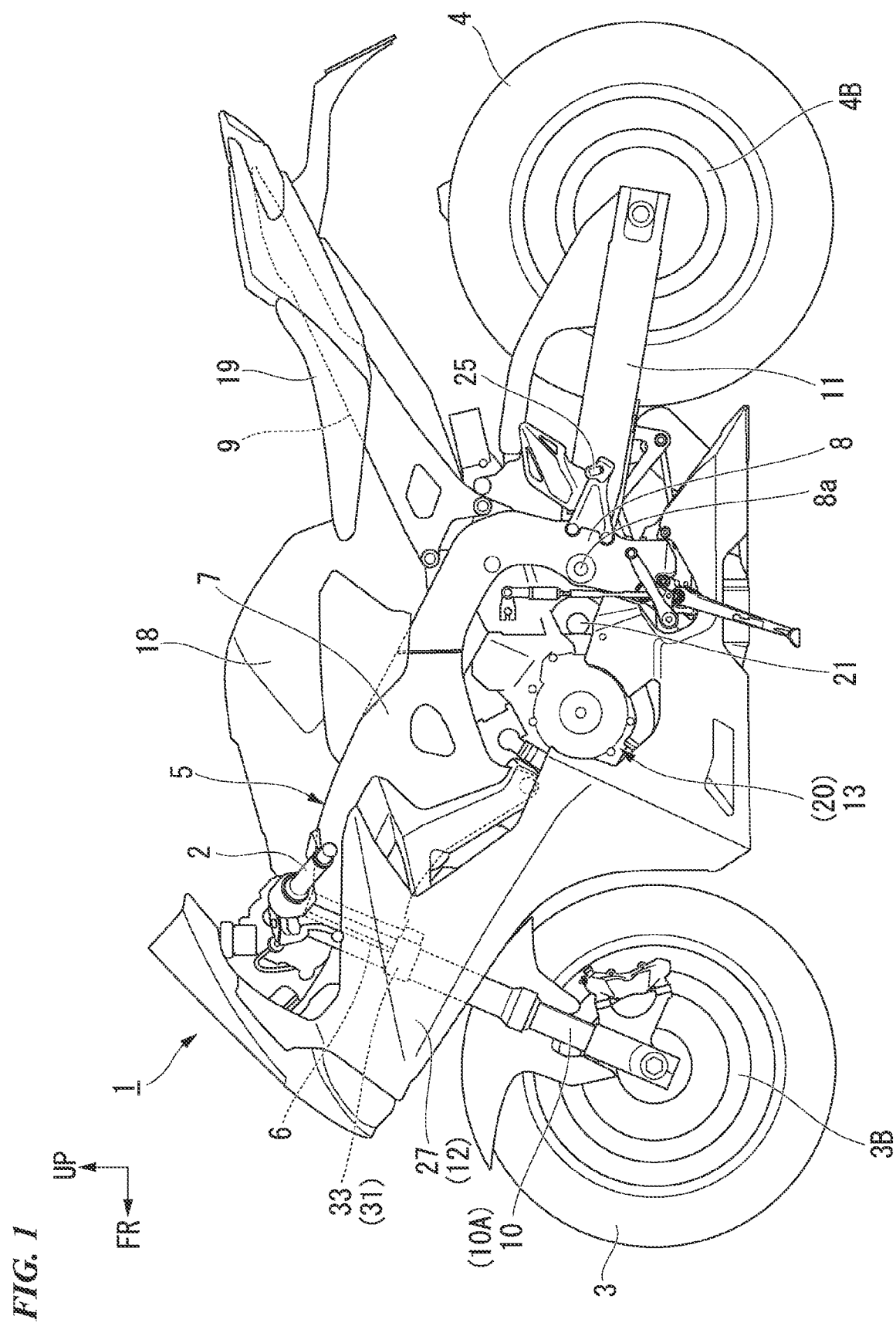
FIG. 1 is a left side view of a motorcycle of an embodiment of the present invention.

Hereinafter, an embodiment of the present invention will be described with reference to the drawings. In the following description, directions such as front, rear, left, and right are the same as the directions of the vehicle described below unless otherwise specified. An arrow FR indicating the front of the vehicle, an arrow LH indicating the left of the vehicle, and an arrow UP indicating the upper side of the vehicle are shown at appropriate locations in the drawings used in the following description.
<Whole Vehicle>

FIG. 1 shows a motorcycle 1 as an example of a vehicle of the embodiment. The motorcycle 1 includes a front wheel (steered wheel) 3 which is steered by a handle 2 and a rear wheel (driving wheel) 4 which is driven by a power unit 20. The motorcycle 1 is a saddle type vehicle in which a driver straddles a vehicle body and is able to swing (bank) the vehicle body in the left and right direction (roll direction) based on ground contact points of the front and rear wheels 3 and 4. The vehicle of the embodiment is not limited to a vehicle that turns in a direction of banking a vehicle body like the motorcycle. The vehicle of the embodiment includes a vehicle that turns by steering a steered wheel without banking the vehicle body.

The motorcycle 1 includes a steering system component 10A having a handle 2 and a front wheel 3. The steering system component 10A is supported by a head pipe 6 to be steerable. The head pipe 6 is located at a front end portion of a vehicle body frame 5 that forms the skeleton of the motorcycle 1. The front wheel 3 is supported by lower end portions of a pair of left and right front forks 10 of the steering system component 10A. The vehicle body frame 5 is surrounded by a vehicle body cover 12.

The vehicle body frame 5 includes the head pipe 6, a pair of left and right main frames 7, a pair of left and right pivot frames 8, and a pair of left and right seat frames 9.

The head pipe 6 steerably supports the steering system component 10A. The left and right main frames 7 extend rearwardly downward from the head pipe 6. The left and right pivot frames 8 extend downward from the rear end portions of the left and right main frames 7 respectively. The left and right seat frames 9 extend rearwardly upward from the respective upper portions of the left and right pivot frames 8.

A pivot shaft 8a extending in the vehicle width direction is provided between the left and right pivot frames 8. The front end portion of the swing arm 11 is supported by the left and right pivot frames 8 through the pivot shaft 8a to swing up and down. The rear wheel 4 is supported by the rear end portion of the swing arm 11. A cushion unit (not shown) serving as a shock absorber is provided between the vehicle body frame 5 and the swing arm 11.

A fuel tank 18 is supported by the upper portions of the left and right main frames 7. A seat 19 is supported behind the fuel tank 18 by the left and right seat frames 9. A pair of steps 25 are arranged below the seat 19 so that the feet of the driver seated on the seat 19 are placed.

The power unit 20 of the motorcycle 1 is supported by the left and right main frames 7 and the left and right pivot frames 8. An output shaft of the power unit 20 is connected to the rear wheel 4 through a chain transmission mechanism (not shown) so that power can be transmitted.

The power unit 20 integrally includes an engine (internal combustion engine) 13 as a prime mover and a transmission 21 connected to the rear of the engine 13.

The motorcycle 1 includes a front wheel brake 3B which brakes the front wheel 3 and a rear wheel brake 4B which brakes the rear wheel 4. Each of the front wheel brake 3B and the rear wheel brake 4B is a disc brake.

The front wheel brake 3B and the rear wheel brake 4B appropriately brake the rotation of the front wheel 3 and the rear wheel 4 by operating a brake lever and a brake pedal which are brake operators. Further, the front wheel brake 3B and the rear wheel brake 4B appropriately brake the rotation of the front wheel 3 and the rear wheel 4 by operating a brake actuator 102 (see FIG. 4) which will be described later.

The motorcycle 1 includes a driving assistance device 70 (see FIG. 4) that assists the driver's driving operation (in the embodiment, the steering operation for steering the front wheel 3 and the braking operation for braking the front wheel 3 and the rear wheel 4). The driving assistance device 70 includes a control device 71 that controls a function of automatically intervening in the driver's driving operation (automatic operation intervention function). The automatic operation intervention function includes an automatic steering intervention function and an automatic braking intervention function. The motorcycle 1 includes a lane keeping assistance system (LKAS). The automatic steering intervention function constitutes at least part of the lane keeping assistance system.

Figure 2:
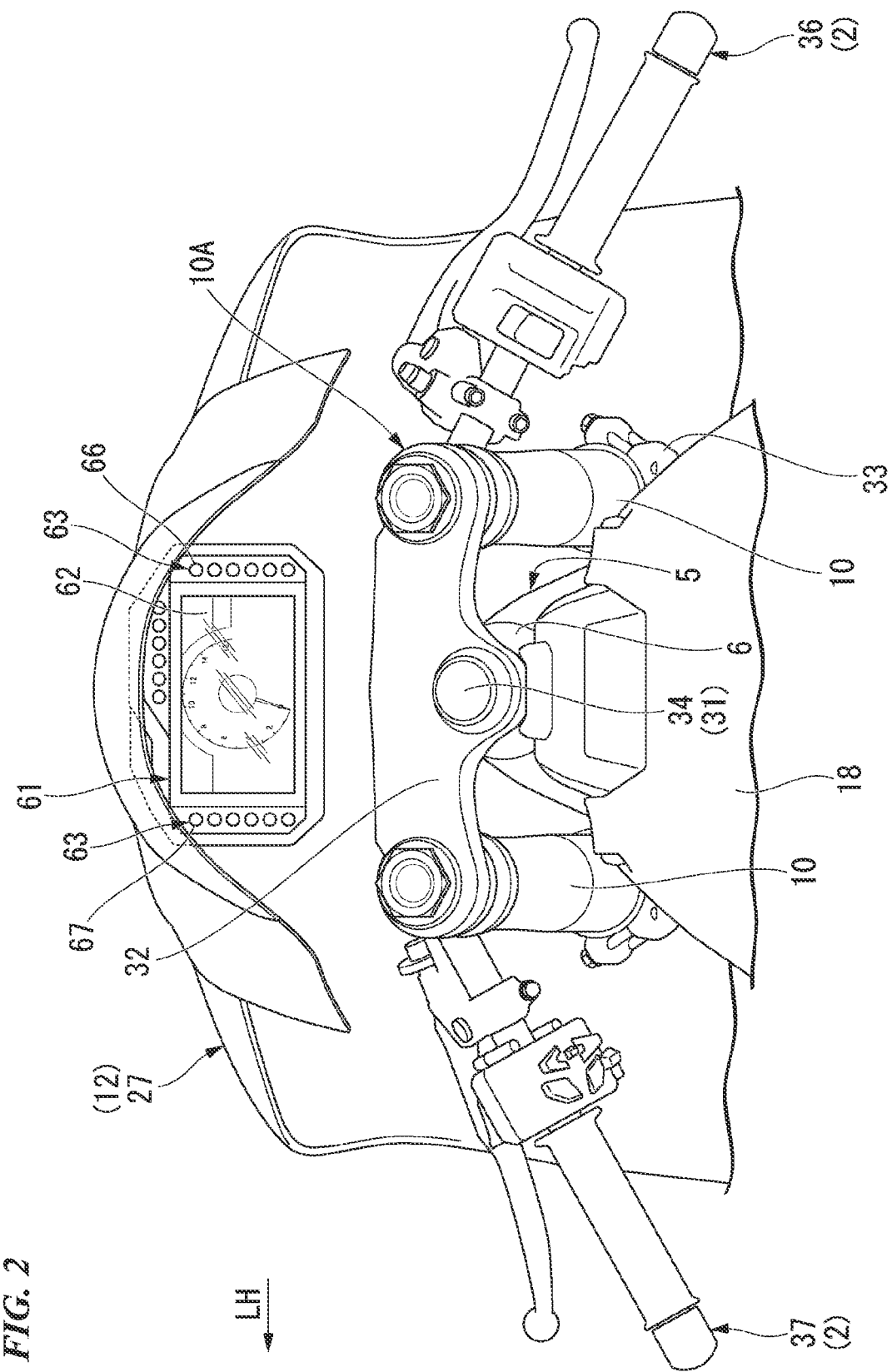
FIG. 2 is a perspective view of a front part of a vehicle body of the motorcycle when viewed from a driver's line of sight.

FIG. 2 shows the front part of the vehicle body when viewed from the driver's line of sight. The upper portions of the left and right front forks 10 are supported by the head pipe 6 through a steering stem 31. The left and right front forks 10 are telescopic shock absorbers. The steering stem 31 includes a top bridge 32 and a bottom bridge 33 which connect the upper portions of the left and right front forks 10 and a stem shaft (steering shaft) 34 which is inserted through the head pipe 6. The front part of the vehicle body is covered with a front cowl 27 of the vehicle body cover 12.

For example, the handle 2 of the motorcycle 1 is separate left and right handles, and includes a pair of left and right handles 37 and 36. For example, the right handle 36 and the left handle 37 are attached to the upper portions of the left and right front forks 10 below the top bridge 32, respectively.

A meter device 61 is disposed in front of the front fork 10. The meter device 61 is supported by the vehicle body frame 5 or the front cowl 27. The meter device 61 includes a display screen 62 such as a liquid crystal display which displays images of a vehicle speed and an engine rotation speed and an indicator lamp group 63 which is arranged around the display screen 62 and notifies various information.

The indicator lamp group 63 includes a right indicator lamp 66 which is disposed on the right side of the display screen 62 and a left indicator lamp 67 which is disposed on the left side of the display screen 62.

The display screen 62 notifies the driver of predetermined information by displaying a predetermined image. The indicator lamp group 63 notifies the driver of predetermined information by performing predetermined light-emitting display (lighting or blinking).

Figure 3:
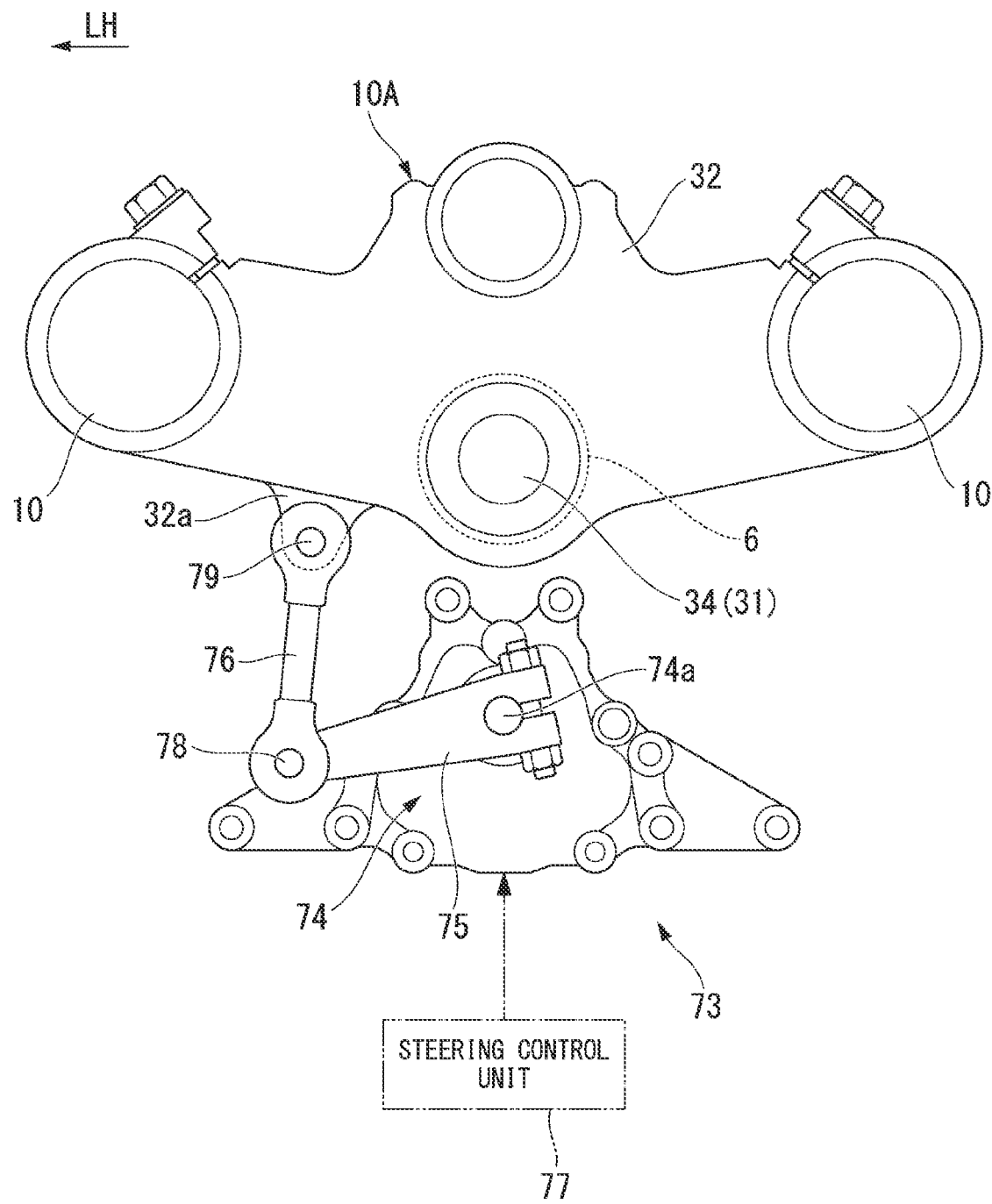
FIG. 3 is an explanatory diagram of a steering actuator of the motorcycle.

FIG. 3 shows the periphery of the top bridge 32 when viewed from above in the axial direction of the stem shaft 34.

A steering input is automatically applied to the steering system component 10A by a steering assist device 73 separately from the operation of the handle 2 by the driver.

The steering assist device 73 includes a steering actuator 74, an arm 75, a connecting rod 76, and a steering control unit 77.

The steering actuator 74 includes an electric motor which is a drive source of the automatic steering intervention function. The steering actuator 74 is fixed to, for example, the vehicle body frame 5. A base end portion of the arm 75 is fixed to a drive shaft 74a which is an output shaft of the steering actuator 74 to be rotatable together. One end portion of the connecting rod 76 is swingably connected to the tip portion of the arm 75 through a first connecting pin 78. The other end portion of the connecting rod 76 is swingably connected to a rod connecting portion 32a provided on the top bridge 32 through a second connecting pin 79.

The operation of the steering actuator 74 is controlled by the steering control unit 77. The output of the steering actuator 74 (the rotation torque of the drive shaft 74a) is transmitted to the top bridge 32 through the arm 75 and the connecting rod 76. Accordingly, the steering actuator 74 generates a steering torque (assist torque) in the steering system component 10A.

<Driving Assistance Device>

Figure 4:
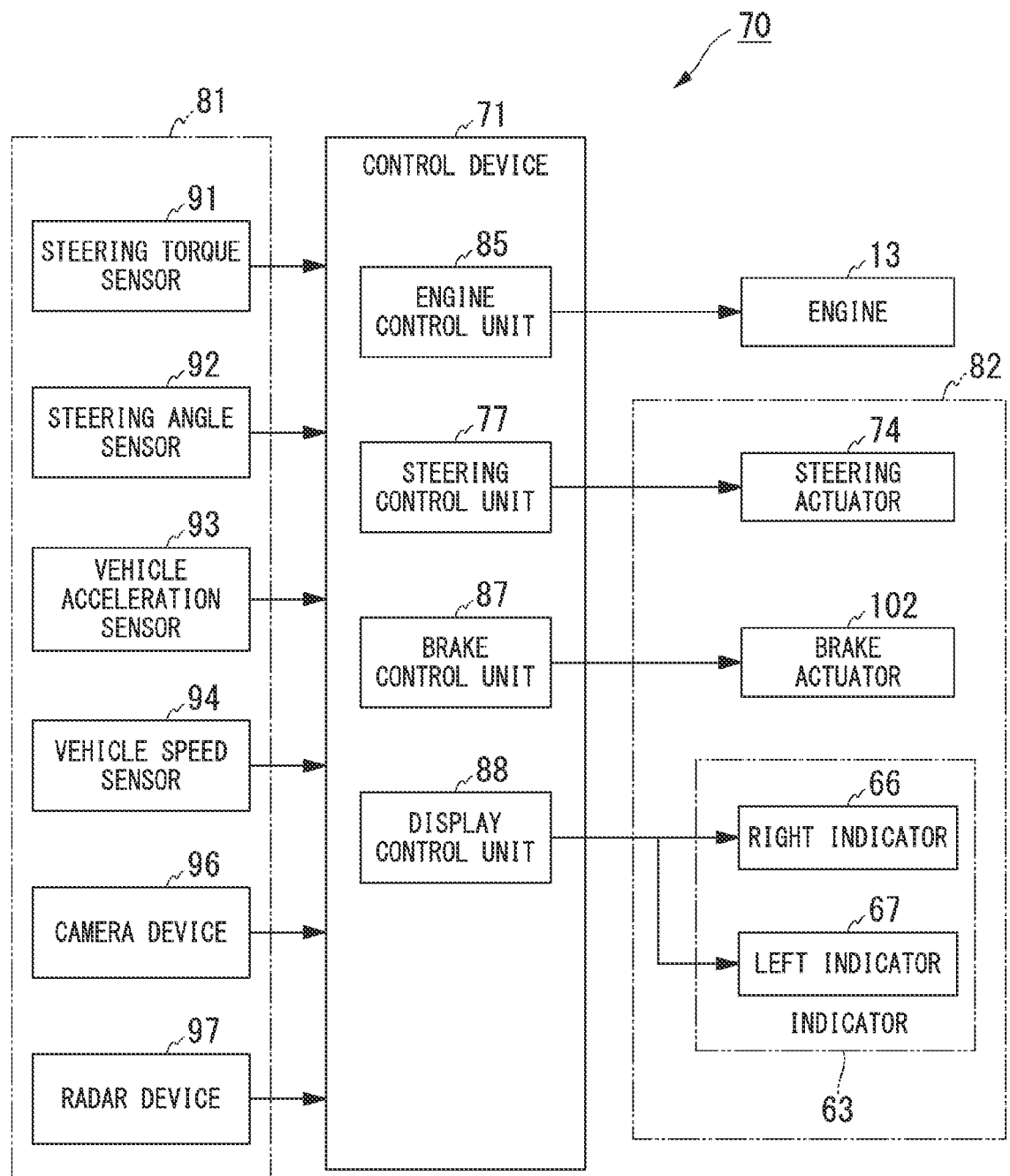
FIG. 4 is a block diagram of a driving assistance device of the motorcycle.

As shown in FIG. 4, the driving assistance device 70 includes a control device 71, various sensors 81, and various devices 82. The control device 71 controls the operation of various devices 82 based on the detection information acquired from various sensors 81.

The control device 71 is composed of, for example, a single or a plurality of ECUs (Electronic Control Units). At least a part of the control device 71 may be realized by cooperation of software and hardware.

The control device 71 includes an engine control unit 85, a steering control unit 77, a brake control unit 87, and a display control unit 88.

Various sensors 81 include a steering torque sensor 91, a steering angle sensor 92, a vehicle acceleration sensor 93, a vehicle speed sensor 94, a camera device 96, and a radar device 97.

The steering torque sensor 91 is, for example, a magnetostrictive torque sensor provided between the handle 2 and the steering system component 10A other than the handle 2. The steering torque sensor 91 detects a torsional torque (steering input) input from the handle 2 to the other steering system components 10A.

The steering angle sensor 92 is, for example, a potentiometer provided on the steering shaft (stem shaft 34). The steering angle sensor 92 detects the turning angle (steering angle) of the steering shaft with respect to the vehicle body.

The vehicle acceleration sensor 93 is a 5-axis or 6-axis IMU (Inertial Measurement Unit). The vehicle acceleration sensor 93 detects the angular velocities of the three axes (roll axis, pitch axis, and yaw axis) of the vehicle body and further can estimate the angle and acceleration from the results.

The vehicle speed sensor 94 detects, for example, the rotation speed of the output shaft of the power unit 20. The vehicle speed sensor 94 can detect the rotation speed of the rear wheel 4 and further the vehicle speed of the motorcycle 1 from the rotation speed.

The camera device 96 includes a camera using a solid-state imaging device such as CCD or CMOS. The camera device 96, for example, periodically photographs the surroundings of the motorcycle 1 (for example, front, rear, left, and right) using the camera. The camera device 96 generates image data from the captured image through image processing such as filtering and binarization.

The radar device 97 radiates radio waves such as millimeter waves around the motorcycle 1. The radar device 97 detects radio waves (reflected waves) reflected by an object around the vehicle. The radar device 97 can detect at least the front, rear, left, and right positions of the object with respect to the motorcycle 1 (distance and orientation with respect to the motorcycle 1) and the speed.

Information from the camera device 96 and the radar device 97 described above is used to recognize the position, type, speed, and the like of an object in the detection direction. Based on this recognition, driving assistance control, automatic driving control, and the like of the motorcycle 1 are performed.

Various devices 82 include the steering actuator 74, the brake actuator 102, and the indicator lamp group 63.

The steering actuator 74 generates a steering torque for steering the front wheel 3 independently of the operation of the handle 2 by the driver. The steering actuator 74 may also serve as a steering damper.

The brake actuator 102 operates the front wheel brake 3B and the rear wheel brake 4B by supplying a hydraulic pressure to the front wheel brake 3B and the rear wheel brake 4B separately from the operation of the brake operator by the driver. The brake actuator 102 may also serve as an ABS (Anti-lock Brake System) control unit. The brake actuator 102 may be connected to a brake line branched from the normal brake circuit.

The indicator lamp group 63 includes a right indicator lamp 66 and a left indicator lamp 67. The right indicator lamp 66 and the left indicator lamp 67 emit light while being interlocked with, for example, the operation of the steering actuator 74 and the brake actuator 102. Accordingly, this allows the driver to recognize that the driving assistance device 70 is functioning.

Next, the control device 71 will be described.

The engine control unit 85 controls the output of the engine 13 based on the throttle opening, intake negative pressure, fuel injection amount, valve timing, ignition timing, and the like in the engine 13. Further, the vehicle speed of the motorcycle 1 is changed according to the crankshaft rotation speed of the engine 13 and the gear ratio of the transmission 21 by controlling the output of the engine 13.

The steering control unit 77 controls the operation of the steering actuator 74 based on the following signals and information. The signals and information are the steering torque signal detected by the steering torque sensor 91, the angular velocity signal detected by the vehicle acceleration sensor 93, the vehicle speed signal detected by the vehicle speed sensor 94, the detection information detected by the camera device 96 and the radar device 97, and the like. Accordingly, the assist torque is applied to the steering system component 10A. By this assist torque, the steering of the front wheel 3 which is a steered wheel is assisted. In this way, the steering control unit 77 controls the automatic steering intervention function.

The brake control unit 87 controls the operation of the brake actuator 102 based on the engine output, the vehicle speed signal detected by the vehicle speed sensor 94, the detection information detected by the camera device 96 and the radar device 97, and the like. Accordingly, the front wheel brake 3B and the rear wheel brake 4B generate an assist braking force. By this assist braking force, the braking of the front wheel 3 and the rear wheel 4 is assisted. In this way, the brake control unit 87 controls the automatic braking intervention function.

The display control unit 88 controls the light emission (lighting or blinking) of the right indicator lamp 66 and the left indicator lamp 67 in accordance with the control of the following functions. The above-described function control includes the control of the automatic steering intervention function by the steering control unit 77 and the control of the automatic braking intervention function by the brake control unit 87.

The display control unit 88 controls the steering actuator 74 and the brake actuator 102 synchronously when they are operating.

The engine control unit 85, the steering control unit 77, the brake control unit 87, and the display control unit 88 described above all include microcomputers and are configured to communicate with each other.

<Response to Disturbance in Steering Intervention Function>

Hereinafter, an example of response to disturbance in a steering intervention function will be described. In the following description, it is assumed that the road in which the motorcycle 1 travels is left-hand traffic, but the present invention is also applicable to a right-hand traffic road.

Figure 5:
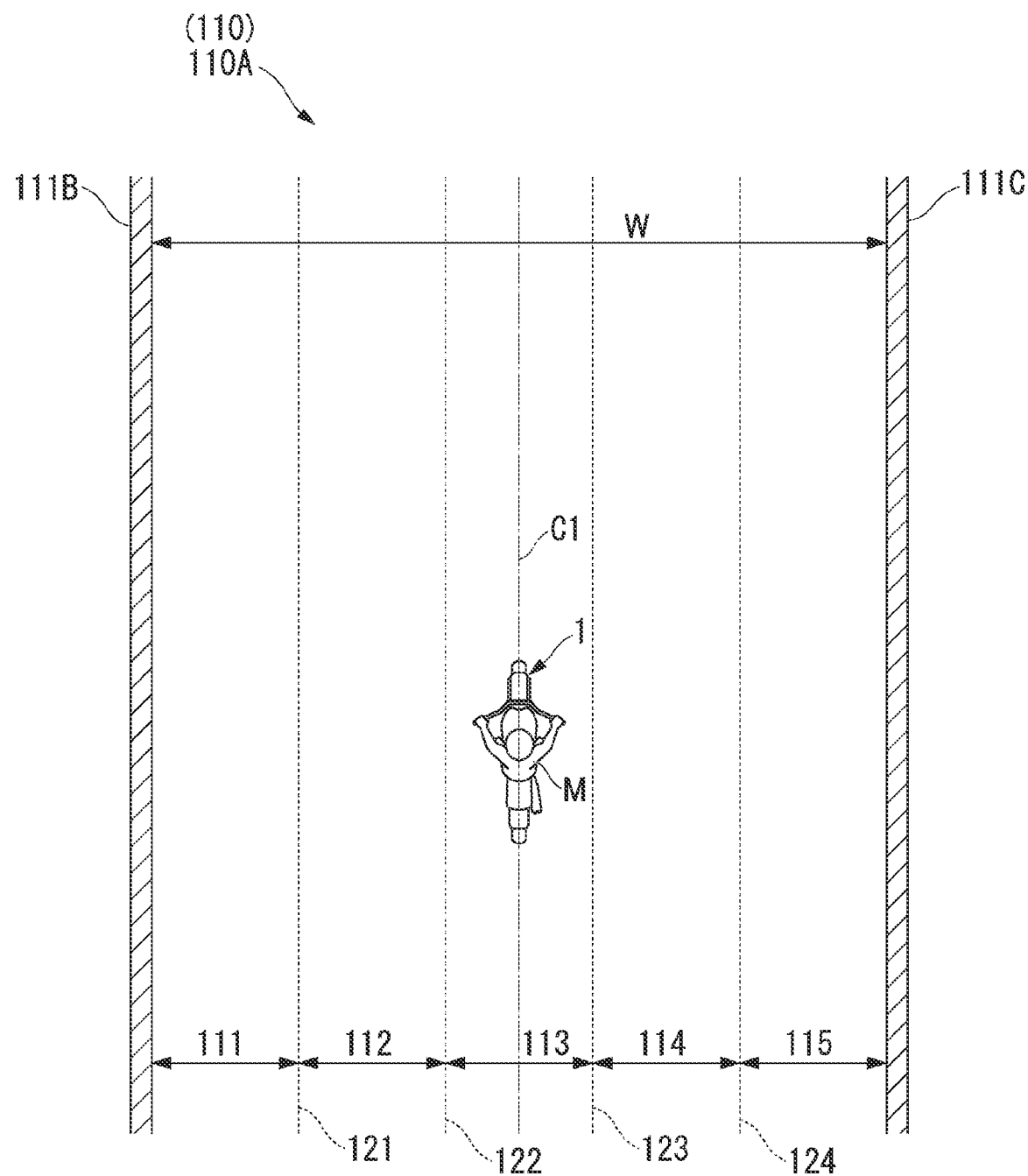
FIG. 5 is an explanatory diagram showing a plurality of virtual lanes which are set on a driving lane by a control device of the driving assistance device.

As shown in FIG. 5, one of a plurality of lanes constituting a road 110 or a single lane constituting the road 110 is referred to as a lane 110A. The lane 110A is partitioned by marking lines 111B and 111C on both left and right sides. When the lane 110A is one of a plurality of lanes, the lane is separated from other lanes by the pair of left and right parallel marking lines 111B and 111C. When the lane 110A is a single lane, at least one of the marking lines 111B and 111C may be a curb or a road shoulder. In the case of a left-hand traffic road, the left marking line 111B may be a curb or a road shoulder, and the right marking line 111C may be a median strip.

Referring to FIG. 4, detection information of the lane 110A in which the motorcycle 1 travels is input to the steering control unit 77 of the control device 71 by the camera device 96 and the radar device 97.

The steering control unit 77 performs setting of equally dividing the width W of the lane 110A (the distance between the left and right marking lines 111B and 111C) into a plurality of virtual lanes in the width direction based on the detection information from the camera device 96 and the radar device 97. For example, a first virtual lane 111, a second virtual lane 112, a third virtual lane 113, a fourth virtual lane 114, and a fifth virtual lane 115 are set in order from the left marking line 111B. For example, the width of each of the virtual lanes 111 to 115 is set so that the motorcycle 1 can roll the vehicle body.

For example, the steering control unit 77 substantially equally divides the width W of the lane 110A in the width direction to set each of the virtual lanes 111 to 115. For example, the steering control unit 77 may set the width of the third virtual lane 113 at the center of the lane 110A in the width direction to be wider than the other virtual lanes. The steering control unit 77 may set the widths of the first virtual lane 111 and the fifth virtual lane 115 at the outermost end to be narrower than the other virtual lanes.

Virtual lane boundary lines 121, 122, 123, and 124 are respectively set at the boundary positions of the virtual lanes from the first virtual lane 111 to the fifth virtual lane 115 by the steering control unit 77. The virtual lane boundary lines 121, 122, 123, and 124 are parallel to the marking lines 111B and 111C.

For example, the steering control unit 77 controls the automatic steering intervention function so that the motorcycle 1 travels along the virtual lane boundary lines 122 and 123 at the center of the third virtual lane 113 located at the center of the lane 110A in the width direction. When the motorcycle 1 travels forward, the steering control unit 77 controls the vehicle so that a vehicle center line C1 extending in the front to rear direction of the vehicle through the center of the motorcycle 1 in the vehicle width direction is parallel to the marking lines 111B and 111C.

Here, when the motorcycle 1 receives lateral disturbance such as strong crosswind, it is conceivable that the motorcycle 1 is about to deviate in the width direction from the currently traveling virtual lane. This is a case in which the traveling direction of the motorcycle 1 deviates in the width direction even though there is no handle input by a driver M. In this case, the steering control unit 77 of the control device 71 attempts to return the motorcycle 1 to the inside (center side) in the width direction of the virtual lane in which the motorcycle 1 is currently traveling by steering control. The steering control at this time includes yaw angle feedback control and lateral position feedback control, which will be described later. Additionally, the steering control is not limited to the control of returning the motorcycle 1 to the center side in the width direction of the current virtual lane. The steering control may simply be control to return to the inside in the width direction of the current virtual lane.

As shown in FIG. 6(a), the following angle θ may increase and become equal to or larger than a predetermined first threshold θ1 due to lateral disturbance while the motorcycle 1 travels. The angle θ is an angle between a direction in which the lane 110A extends (a direction along the marking lines 111B and 111C) and the traveling direction of the motorcycle 1 (a direction along the vehicle center line C1). When the angle θ becomes equal to or larger than the first threshold θ1, the steering control unit 77 controls the vehicle so that the inclination in the traveling direction is returned by the steering intervention function (reduced).

That is, as shown in FIG. 6(b), the steering control unit 77 performs the steering control, for example, so that the angle θ becomes smaller than a target value (a predetermined second threshold θ2) smaller than the first threshold θ1. In the embodiment, the above-described angle θ is referred to as a yaw angle and the above-described steering control is referred to as yaw angle feedback control. By this yaw angle feedback control, the yaw angle θ is suppressed to be smaller than the target value and the traveling in the lane 110A of the motorcycle 1 is kept (lane keeping).

Figure 6:
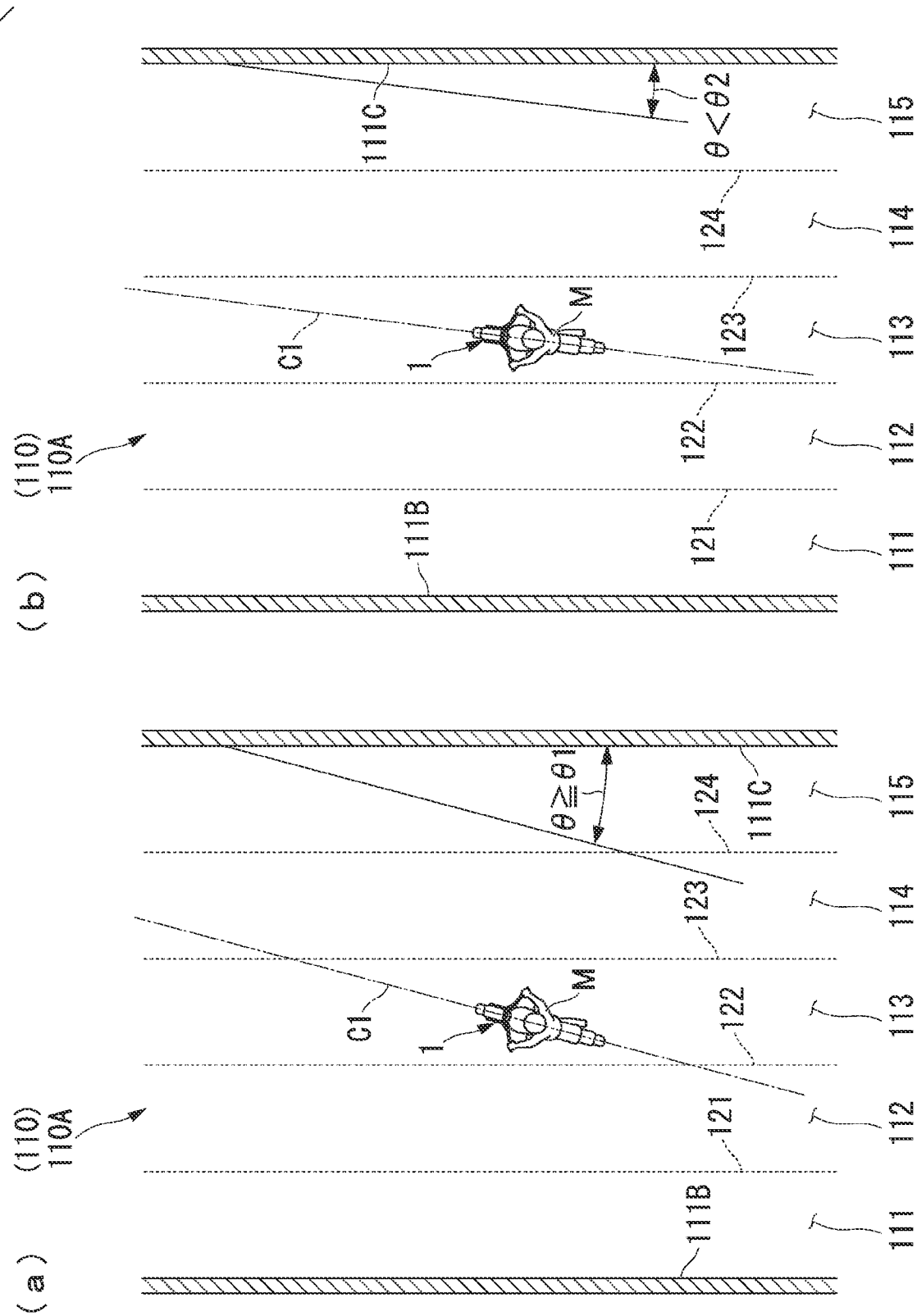
FIG. 6 is an explanatory diagram showing yaw angle feedback control performed by the control device.

Additionally, in FIG. 6, if the driver M performs the following steering operation (handle input) when the automatic steering intervention function is operated by the steering control unit 77, the automatic steering intervention function stops. That is, when the driver M performs a steering operation to change the lane from the third virtual lane 113 to the second virtual lane 112 or the fourth virtual lane 114, the steering operation is prioritized and the automatic steering intervention function stops.

Figure 7:
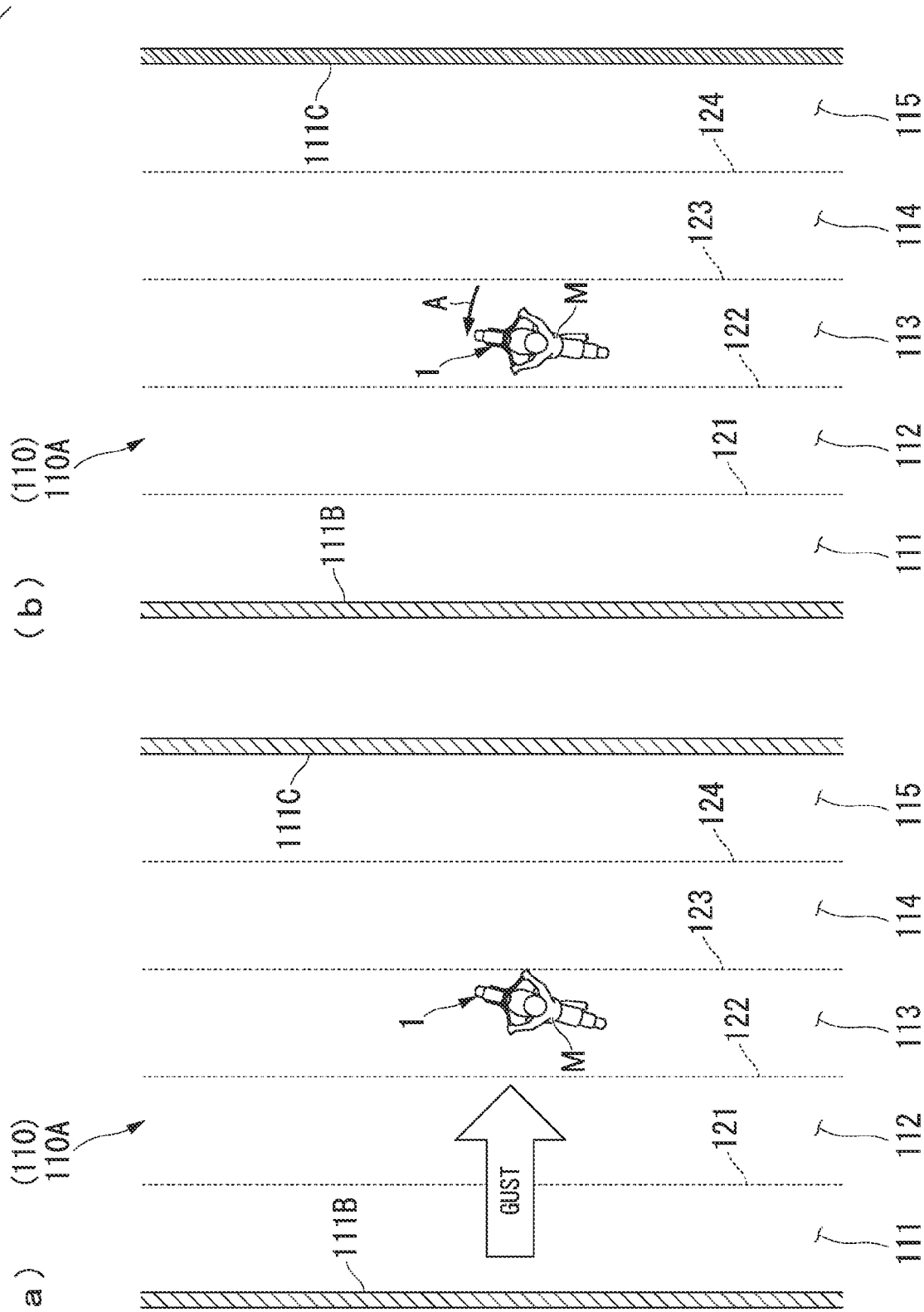
FIG. 7 is an explanatory diagram showing lateral position feedback control performed by the control device.

As shown in FIG. 7(a), for example, the motorcycle 1 may receive lateral disturbance such as gust while traveling in the third virtual lane 113. In this case, the motorcycle 1 is likely to deviate from the third virtual lane 113 to one of the left and right sides (toward the fourth virtual lane 114 in the drawing) without a steering operation (handle input) to change the lane. Also in this case, the automatic steering intervention function by the steering control unit 77 is operated.

The camera device 96 and the radar device 97 perform the following detection while the motorcycle 1 travels in the third virtual lane 113. That is, the camera device 96 and the radar device 97 keep the detection of the distance in the lane width direction between the vehicle body of the motorcycle 1 and the virtual lane boundary lines 122 and 123 on both left and right sides of the motorcycle 1. When the lane keeping assistance system is activated during normal traveling without lateral disturbance, the steering control unit 77 performs the following control. That is, the steering control unit 77 controls the motorcycle 1 so that the motorcycle does not deviate from the currently traveling virtual lane (the motorcycle keeps traveling in the current virtual lane). The steering control unit 77 applies a relatively weak steering torque to the steering system component 10A and controls the vehicle so that the motorcycle 1 is returned to the center side in the width direction of the current virtual lane.

Then, as shown in FIG. 7(a), even when the motorcycle 1 receives lateral disturbance, the steering control unit 77 applies a relatively strong steering torque to the steering system component 10A. Accordingly, as shown in FIG. 7(b), the motorcycle 1 can be returned to the inside of the current virtual lane.

For example, the steering control unit 77 performs the following control when detecting that the distance between the motorcycle 1 traveling in the third virtual lane 113 and the right virtual lane boundary line 123 in the lane width direction is smaller than a predetermined threshold. That is, the steering control unit 77 controls the driving of the steering actuator 74 based on this detection information. Accordingly, a relatively strong steering torque is applied to the steering system component 10A and the vehicle body of the motorcycle 1 is turned to the left as indicated by the arrow A in FIG. 7(b). That is, the steering control is performed so that the motorcycle 1 is returned to the inside of the third virtual lane 113 (the center side in the width direction).

In this way, when the motorcycle 1 is about to leave from the third virtual lane 113, the position (lateral position) of the motorcycle 1 in the vehicle width direction is corrected. This steering control is referred to as lateral position feedback control.

If the driver M performs the following steering operation (steering wheel input) even when this lateral position feedback is performed, the automatic steering intervention function stops. That is, when the driver M performs the steering operation to change the lane from the third virtual lane 113 to the second virtual lane 112 or the fourth virtual lane 114, the steering operation is prioritized and the automatic steering intervention function stops.

In the case of a vehicle such as the motorcycle 1 that rolls (banks) the vehicle body to give a steering angle to the steered wheel (front wheel 3), the following operation is performed to turn the vehicle body in the direction of arrow A. That is, the steered wheel is first steered in the direction opposite to the direction of the arrow A (reverse handle), and the vehicle body is rolled in the direction of the arrow A, thereby causing the steered wheel to have a steering angle.

As shown in FIG. 8(a), when the traveling direction of the motorcycle 1 is inclined to the right in the drawing due to disturbance such as lateral gust, the control of the automatic steering intervention function changes according to the change speed of the yaw angle θ (hereinafter, referred to as yaw angular velocity) dθ/dt.

As shown in FIG. 8(b), when the yaw angular velocity dθ/dt obtained by differentiating the change amount of the yaw angle θ is smaller than a predetermined first threshold Th1 (dθ/dt<Th1), the steering control unit 77 performs the following control. That is, the steering control unit 77 performs the steering control to turn the traveling direction of the motorcycle 1 in the direction opposite to a change in the yaw angle (the direction of the arrow B in the drawing). That is, the steering control unit 77 controls the automatic steering intervention function to keep the traveling in the third virtual lane 113.

As shown in FIG. 8(c), when the yaw angular velocity dθ/dt is equal to or larger than the threshold Th1 (dθ/dt≥Th1), the steering control unit 77 performs the following control. That is, the steering control unit 77 performs the steering control so that the traveling direction of the motorcycle 1 is gently returned by also using the fourth virtual lane 114 adjacent in the yaw angle change direction (the direction of the arrow C in the drawing). That is, the steering control unit 77 controls the automatic steering intervention function to change the lane from the third virtual lane 113 to the fourth virtual lane 114 adjacent in the yaw angle change direction. The reason for performing such control is that there is the following concern. That is, this is because the motorcycle 1 or the driver M may behave significantly if sudden steering control is performed to keep the traveling in the third virtual lane 113 when the yaw angular velocity dθ/dt is large.

Further, when the yaw angular velocity dθ/dt exceeds a predetermined second threshold Th2 as a threshold larger than the threshold Th1, the steering control unit 77 performs the following control. That is, the steering control unit 77 performs the steering control so that the traveling direction of the motorcycle 1 is gently returned while allowing the change of the lane to the fifth virtual lane 115 at the second adjacent lane in the yaw angle change direction (see symbol 1' in the drawing). That is, the steering control unit 77 controls the automatic steering intervention function to change the lane from the third virtual lane 113 to the fifth virtual lane 115 at the second adjacent lane in the yaw angle change direction. In this way, it is possible to suppress the motorcycle 1 or the driver M from behaving significantly by increasing the lane width required for correcting the traveling direction according to the strength of the disturbance.

As shown in FIG. 9(a), for example, a case in which the vehicle receives gust as disturbance from the side of the vehicle (the left side of the vehicle) while traveling in the third virtual lane 113 of the lane 110A will be described. In this case, the steering control unit 77 (see FIG. 4) performs control to operate the automatic steering intervention function as follows.

The gust suddenly and strongly acts on the motorcycle 1 and the driver M. The behavior of the motorcycle 1 and the driver M increases when the steering angle, vehicle acceleration, yaw angle, vehicle speed, and the like detected by the various sensors 81 (see FIG. 4) of the motorcycle 1 increase due to gust. It is also possible to quickly return the direction of the motorcycle 1 from this state and keep the traveling in the third virtual lane 113. However, in that case, the behavior of the motorcycle 1 and the driver M becomes large as in the case of gust.

Therefore, as shown in FIG. 9(b), when a change in the yaw angle is large, the steering control unit 77 allows the change of the lane to a first adjacent lane or a second adjacent lane according to a change in the yaw angle. Accordingly, a sudden steering operation is not performed and a steering operation with a margin is performed compared to a case in which the motorcycle 1 tries to stay in the traveling third virtual lane 113. Therefore, the stability of the motorcycle 1 can be ensured, the influence on the posture of the driver M can be suppressed, and the marketability of the vehicle can be improved.

Figure 9:
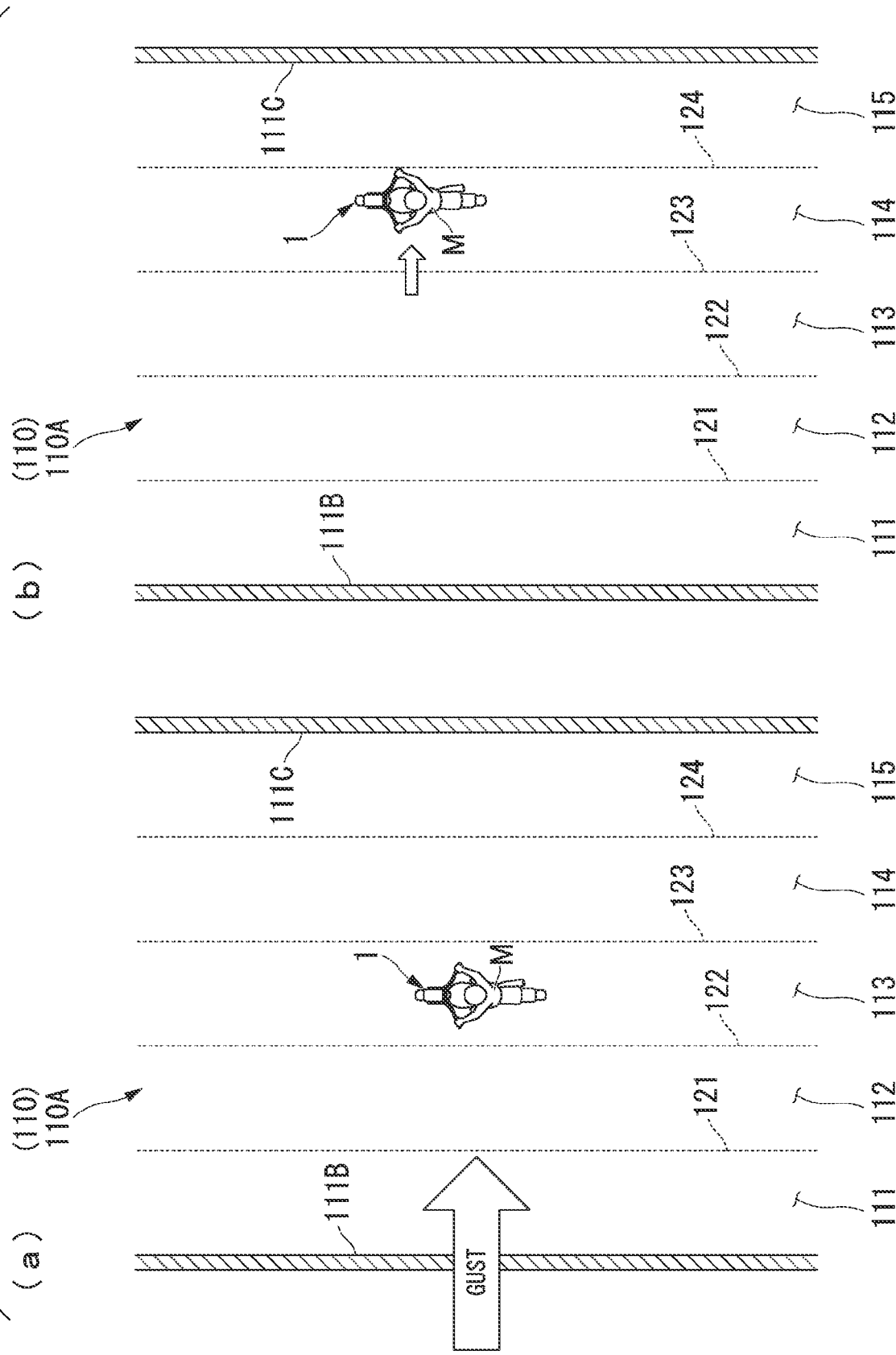
FIG. 9 is an explanatory diagram showing an example of steering control during gusts.
Figure 10:
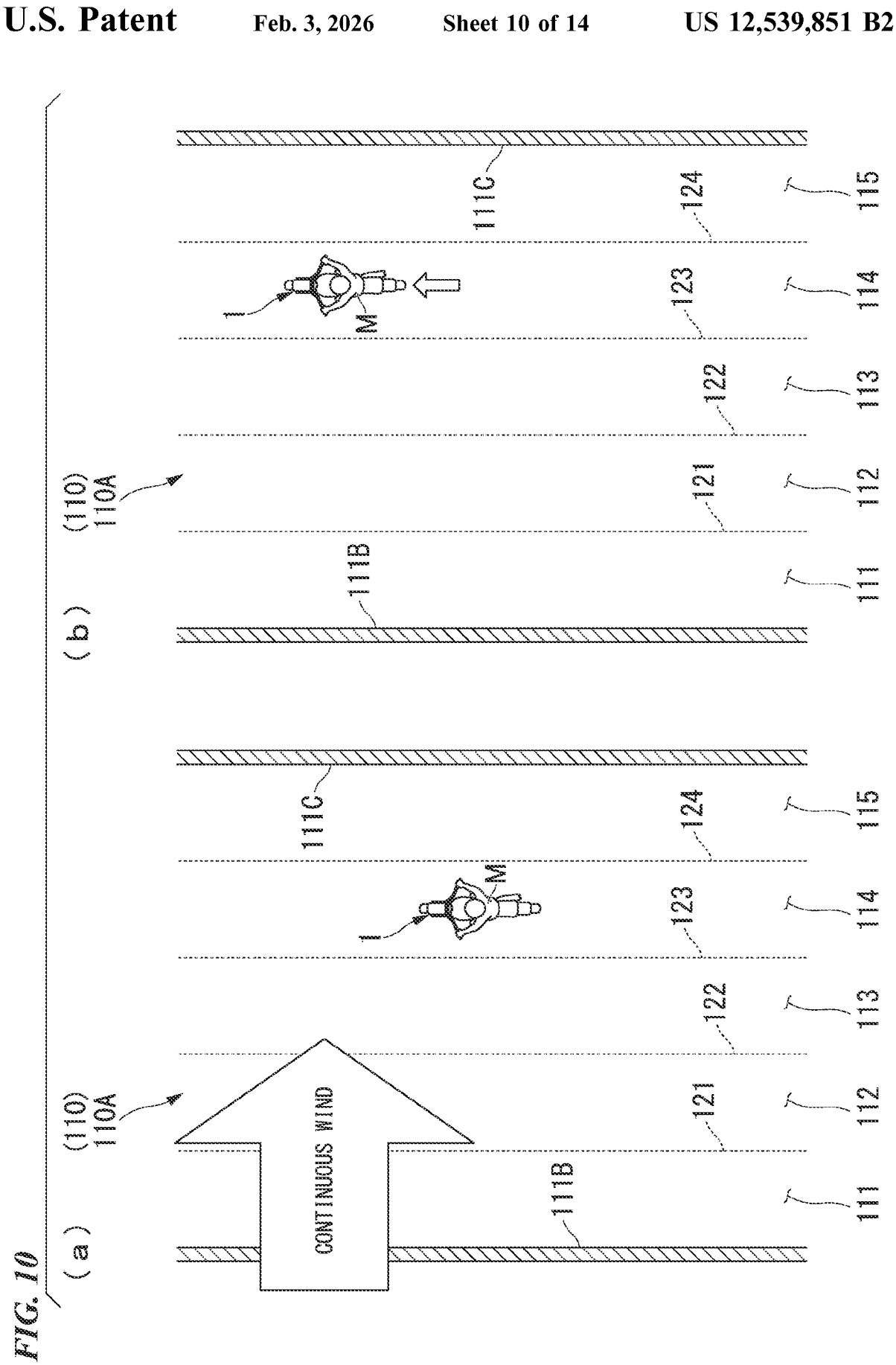
FIG. 10 is an explanatory diagram showing an example of steering control during continuous crosswind.

FIG. 10 shows the steering control when crosswind does not stop even after the motorcycle 1 changes lanes to the fourth virtual lane 114 as shown in FIG. 9, that is, when continuous crosswind (continuous wind) is received from the side of the vehicle (the left side of the vehicle body). In this case, the steering control unit 77 keeps controlling for operating the automatic steering intervention function.

The continuous wind shown in FIG. 10(a) continues with less strength than, for example, temporary gust. At this time, changes in the steering angle, vehicle acceleration, yaw angle, vehicle speed, and the like detected by various sensors 81 (see FIG. 4) of the motorcycle 1 due to continuous wind are the same or smaller than those in the case of the temporary gust. In this case, as shown in FIG. 10(b), the steering control unit 77 performs the steering control of keeping the traveling of the motorcycle 1 in the fourth virtual lane 114. At this time, sudden steering control of the motorcycle 1 is not necessary, the stability of the motorcycle 1 can be ensured, and the influence on the posture of the driver M can be suppressed.

FIG. 11 is a graph showing a change in the yaw angle θ over time when receiving "sudden crosswind" and "gust (sudden strong crosswind)" from the side while the motorcycle 1 travels. In each graph, the vertical axis indicates the yaw angle θ of the motorcycle 1 and the horizontal axis indicates the time T. It is assumed that "sudden crosswind" and "gust" start at the time T=0 and stop at the time T=t1.

The "sudden crosswind" of FIG. 11(a) is relatively weak sudden crosswind. The yaw angle θ of the motorcycle 1 receiving this "sudden crosswind" gradually increases until the maximum yaw angle θ=a1 after the occurrence of crosswind. The yaw angular velocity dθ/dt which is an inclination of the line L1 indicating the yaw angle θ during this period is smaller than the first threshold Th1 (dθ/dt<Th1).

As a result, the steering control unit 77 performs the following control as shown in FIG. 8(b). That is, the steering control unit 77 controls the automatic steering intervention function so that the yaw angle θ decreases while keeping the virtual lane (for example, the third virtual lane 113) in which the motorcycle 1 travels in the lane 110A.

After the yaw angle θ=a1, the automatic steering intervention function by the steering control unit 77 is continued so that the yaw angle θ gradually decreases.

The "gust" of FIG. 11(b) is relatively strong sudden crosswind. The yaw angle θ of the motorcycle 1 receiving this "gust" sharply increases until the maximum yaw angle θ=a2 after the occurrence of the gust. The yaw angular velocity dθ/dt which is an inclination of the line L2 indicating the yaw angle θ during this period is equal to or larger than the first threshold Th1 (dθ/dt≥Th1).

As a result, the steering control unit 77 performs the following control as shown in FIG. 8(c). That is, the steering control unit 77 changes the lanes from the virtual lane (for example, the third virtual lane 113) in which the motorcycle 1 travels in the lane 110A to the adjacent virtual lane. At this time, the steering control unit 77 controls the automatic steering intervention function so that the yaw angle θ decreases.

After the yaw angle θ=a2, the yaw angle θ becomes almost flat. Then, the automatic steering intervention function by the steering control unit 77 is continued so that the yaw angle θ gradually decreases.

FIG. 12 is a graph showing a change in the yaw angle θ over time when receiving "continuous crosswind" and "continuous strong crosswind" from the side while the motorcycle 1 travels. The "continuous crosswind" and "continuous strong crosswind" start at the time T=0 and stop at the time T=t2.

The "continuous crosswind" of FIG. 12(a) is relatively weak crosswind that continues continuously. The yaw angle θ of the motorcycle 1 receiving this "continuous crosswind" gradually increases until the maximum yaw angle θ=a3 after the occurrence of continuous crosswind. The yaw angular velocity dθ/dt which is an inclination of the line L3 indicating the yaw angle θ during this period is smaller than the first threshold Th1 (dθ/dt<Th1).

As a result, the steering control unit 77 performs the following control as shown in FIG. 8(b). That is, the steering control unit 77 controls the automatic steering intervention function so that the yaw angle θ decreases while keeping the virtual lane (for example, the third virtual lane 113) in which the motorcycle 1 travels in the lane 110A.

After the yaw angle θ=a3, the automatic steering intervention function by the steering control unit 77 is continued so that the yaw angle θ gradually decreases.

The "continuous strong crosswind" of FIG. 12(b) is relatively strong crosswind that continues continuously. The yaw angle θ of the motorcycle 1 receiving this "continuous strong crosswind" sharply increases until the yaw angle θ=a4 after the occurrence of continuous strong crosswind. The yaw angular velocity dθ/dt which is an inclination of the line L4 indicating the yaw angle θ during this period is equal to or larger than the first threshold Th1 (dθ/dt≥Th1).

As a result, the steering control unit 77 performs the following control as shown in FIG. 8(c). That is, the steering control unit 77 changes the lanes from the virtual lane (for example, the third virtual lane 113) in which the motorcycle 1 travels in the lane 110A to the adjacent virtual lane. At this time, the steering control unit 77 controls the automatic steering intervention function so that the yaw angle θ decreases.

After the yaw angle θ=a4, the yaw angle θ becomes almost flat. Then, the automatic steering intervention function by the steering control unit 77 is continued so that the yaw angle θ gradually decreases.

At a time point in which the yaw angle θ increases to the yaw angle θ=a4, the vehicle body of the motorcycle 1 drifts downwind, so that the traveling direction follows the direction of the crosswind. Therefore, after reaching the yaw angle θ=a4, the motorcycle 1 gradually increases the yaw angle θ to reach the maximum yaw angle θ=a5. Between the yaw angles θ=a4 and θ=a5, the vehicle body is less susceptible to crosswind and an increase in yaw angle θ slows down. Then, the automatic steering intervention function is controlled by the steering control unit 77 so that the yaw angle θ gradually decreases.

As described above, the motorcycle 1 of the embodiment includes the lane keeping assistance system and the control device 71 which controls the steering of the motorcycle 1. The control device 71 divides the width of the lane 110A in which the motorcycle 1 travels into the plurality of virtual lanes 111, 112, 113, 114, and 115. The control device 71 controls the motorcycle 1 so that the motorcycle travels in one virtual lane among the plurality of virtual lanes 111, 112, 113, 114, and 115.

According to this configuration, in the vehicle including the lane keeping assistance system, the plurality of virtual lanes 111, 112, 113, 114, and 115 are divided in the width of the lane 110A and the vehicle is controlled to travel in one of these virtual lanes. Accordingly, even when the vehicle receives sudden disturbance, the vehicle can keep traveling in the same lane while allowing the movement in the divided virtual lane. Accordingly, it is possible to suppress unnatural behavior from being given to the driver while keeping the straightness of the vehicle.

In the motorcycle 1, the control device 71 performs the following control when the motorcycle 1 traveling in the one virtual lane is about to deviate from the inside of the one virtual lane. That is, the control device 71 controls the vehicle so that the traveling position of the motorcycle 1 is returned to the inside of the one virtual lane.

According to this configuration, when the traveling vehicle is about to deviate from the one virtual lane, the traveling position is controlled to be returned to the inside of the one virtual lane. Accordingly, it is possible to keep the traveling in the divided virtual lane and to keep the straightness of the vehicle.

In the motorcycle 1, the width of each of the plurality of virtual lanes 111, 112, 113, 114, and 115 is set to be uniform. Accordingly, the driver can easily recognize the position of each of the virtual lanes 111, 112, 113, 114, and 115.

In the motorcycle 1, the control device 71 performs the following control when the motorcycle 1 traveling in the one virtual lane changes the yaw angle θ with respect to the forward direction along the lane 110A. That is, the control device 71 controls the vehicle so that a change in the yaw angle θ decreases.

According to this configuration, for example, when the yaw angle θ with respect to the forward direction along the lane 110A increases, this yaw angle θ is controlled to decrease. Accordingly, it is possible to keep the straightness of the vehicle by the feedback according to a change in the yaw angle θ.

In the motorcycle 1, the control device 71 performs the following control when a change speed of the yaw angle θ exceeds the first threshold Th1. That is, the control device 71 controls the motorcycle 1 so that a lane is changed to the virtual lane adjacent to the change side of the yaw angle θ with respect to the traveling virtual lane.

According to this configuration, when a change speed of the yaw angle θ exceeds the first threshold Th1 due to the influence of disturbance in a traveling state, a lane is allowed to be changed to the virtual lane adjacent to the traveling virtual lane. Accordingly, it is possible to control the vehicle to compensate for strong disturbance and to suppress the occurrence of unnatural behavior.

In the motorcycle 1, the control device 71 performs the following control when the change speed of the yaw angle θ exceeds the second threshold Th2 larger than the first threshold Th1. That is, the control device 71 controls the motorcycle 1 so that a lane is changed to a second virtual lane adjacent to the change side of the yaw angle θ with respect to the traveling virtual lane.

According to this configuration, when the change speed of the yaw angle θ exceeds the second threshold larger than the first threshold, a lane is allowed to be changed to the second virtual lane adjacent to the traveling virtual lane. Accordingly, it is possible to control the vehicle according to the strength of disturbance and to further suppress the occurrence of unnatural behavior.

Figure 13:
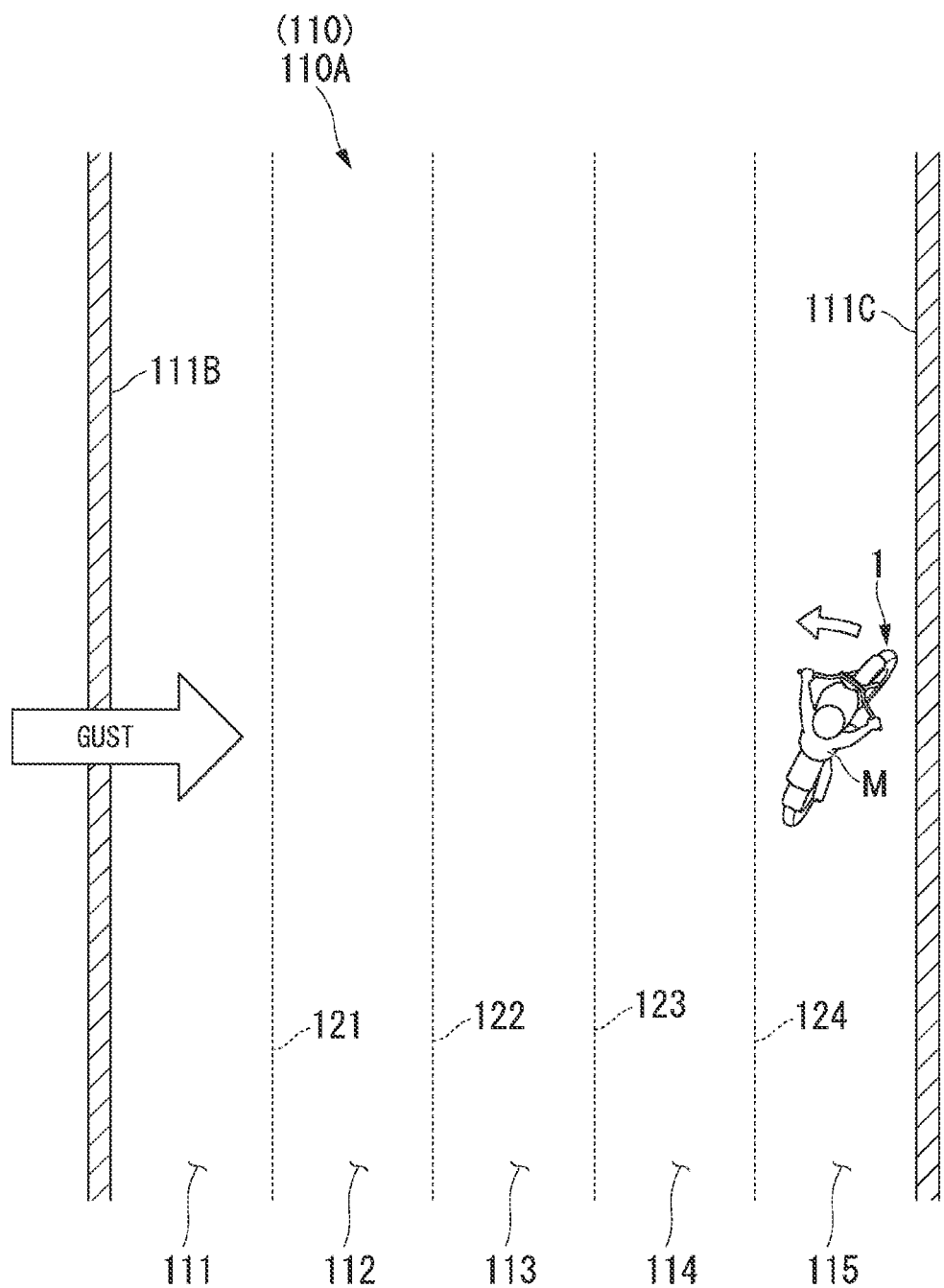
FIG. 13 is an explanatory diagram showing a modified example of the steering control during gusts.

FIG. 13 shows a situation in which the motorcycle 1 travels in the fifth virtual lane 115 which is the virtual lane at the outermost end on one side (right side) of the lane 110A as a modified example of the embodiment. Further, in this case (that is, when there is no lane on the right side that can be changed), gust is received from the opposite side (left side) of the fifth virtual lane 115.

At this time, even when the motorcycle 1 receives gust from the opposite side (left side) of the fifth virtual lane 115, there is no virtual lane on the downwind side of the motorcycle 1. Therefore, the steering control unit 77 controls the automatic steering intervention function so that the motorcycle 1 keeps traveling in the fifth virtual lane 115 based on the detection information of various sensors 81.

When various sensors 81 detect that the motorcycle 1 travels in the fifth virtual lane 115 and this detection information is input to the steering control unit 77, the steering control unit 77 performs the following control. That is, the steering control unit 77 controls the automatic steering intervention function to keep the traveling in the fifth virtual lane 115 without changing the lane of the motorcycle 1 regardless of the yaw angle θ and the yaw angular velocity dθ/dt. Additionally, the same control is performed also when the motorcycle 1 travels in the first virtual lane 111 which is the virtual lane at the outermost end on the other side (left side) of the lane 110A.

In this modified example, the control device 71 performs the following control when the motorcycle 1 travels in the virtual lanes 111 and 115 at the outermost end among the plurality of virtual lanes 111, 112, 113, 114, and 115. That is, the control device 71 controls the motorcycle 1 so that a lane is not changed even when the change speed of the yaw angle θ exceeds the first threshold Th1.

According to this configuration, when the vehicle travels in the virtual lane at the outermost end among the plurality of virtual lanes, the vehicle is controlled so that a lane is not changed even when the change speed of the yaw angle θ exceeds the first threshold. Accordingly, it is possible to keep the traveling of the vehicle in the same lane.

Figure 14:
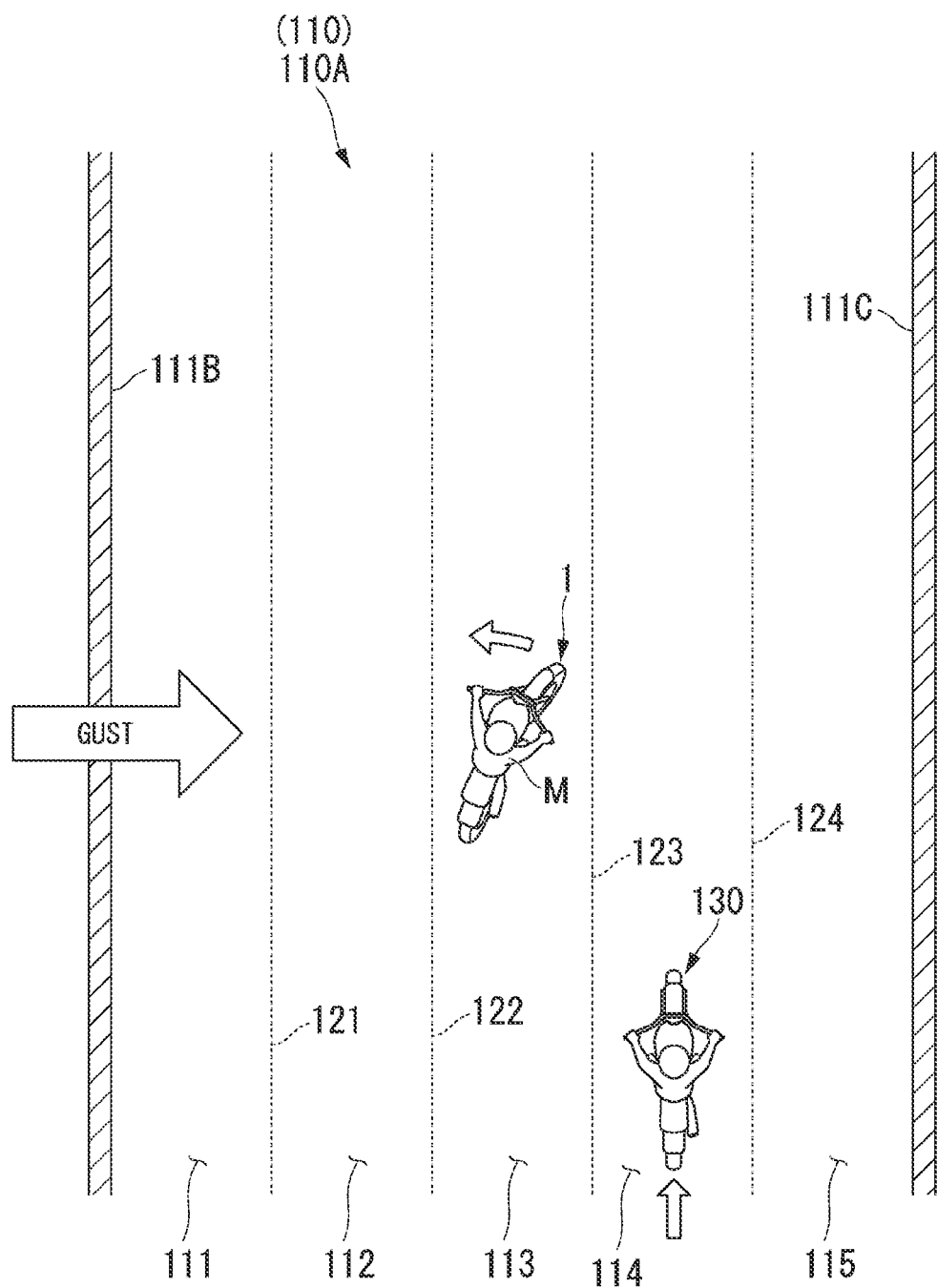
FIG. 14 is an explanatory diagram showing another modified example of the steering control during gusts.

FIG. 14 shows a situation when the motorcycle 1 attempts to change a lane to the adjacent fourth virtual lane 114 while traveling in, for example, the third virtual lane 113 of the lane 110A as another modified example of the embodiment. Further, at this time, a situation is shown in which there is a following vehicle 130 (the other vehicle) traveling in the fourth virtual lane 114 behind the motorcycle 1.

At this time, the steering control unit 77 determines whether or not the inter-vehicle distance between the motorcycle 1 and the following vehicle 130 is shorter than a predetermined threshold based on information detected by various sensors 81. Then, when it is determined that the inter-vehicle distance with respect to the following vehicle 130 is shorter than the threshold, the automatic steering intervention function is controlled to keep the traveling in the third virtual lane 113 without changing the lane of the motorcycle 1. When it is determined that the inter-vehicle distance with respect to the following vehicle 130 is longer than the threshold, the automatic steering intervention function is controlled so that the motorcycle 1 changes the lane to the fourth virtual lane 114.

The steering control unit 77 may detect the relative speed between the motorcycle 1 and the following vehicle 130 based on the detection information from various sensors 81 and may also take this relative speed into consideration when determining whether or not to change a lane.

In this modified example, the control device 71 performs the following controls if the following vehicle 130 travels within a predetermined distance behind the adjacent virtual lane as a lane change target when attempting to cause the motorcycle 1 to change a lane from the one virtual lane to the adjacent virtual lane. That is, the control device 71 controls the motorcycle 1 so that a lane is not changed even when the change speed of the yaw angle θ exceeds the first threshold Th1.

According to this configuration, if the other vehicle travels within a predetermined distance behind the adjacent virtual lane as a lane change target when attempting to cause the motorcycle 1 to change a lane from one virtual lane to the adjacent virtual lane, the following control is performed. That is, the vehicle is controlled such that a lane change is not allowed even when the change speed of the yaw angle θ exceeds the first threshold Th1. Accordingly, it is possible to keep the traveling of the vehicle in the same lane.

Additionally, the present invention is not limited to the above-described embodiment. For example, the present invention can be applied to a vehicle other than the motorcycle. Straddle-type vehicles including motorcycles (including motorized bicycles and scooter-type vehicles) include all vehicles in which the driver straddles the vehicle body. That is, saddle type vehicles include not only two-wheeled vehicles but also three-wheeled vehicles (including vehicles with one front wheel and two rear wheels, as well as vehicles with two front wheels and one rear wheel) or four-wheel vehicles. Further, vehicles with electric motors as prime movers are also included. In particular, a small vehicle such as a saddle type vehicle is desirable because the vehicle is easy to set virtual lanes by dividing a lane into a plurality of lanes, but the present invention is not limited to the saddle type vehicle.

Disturbances acting on the vehicle are not limited to winds such as crosswind and gust of the embodiment, but may include other vehicles, water, earth and sand, plants, falling objects, and the like located around the vehicle.

Then, the configuration of the above-described embodiment is an example of the present invention. That is, various modifications can be made without departing from the gist of the present invention, such as replacing the constituent elements of the embodiments with well-known constituent elements.

BRIEF DESCRIPTION OF THE REFERENCE SYMBOLS

1: Motorcycle (vehicle)
71: Control device
110A: Lane
111: First virtual lane (virtual lane)
112: Second virtual lane (virtual lane)
113: Third virtual lane (virtual lane)
114: Fourth virtual lane (virtual lane)
115: Fifth virtual lane (virtual lane)
130: Other vehicle
Th1: First threshold
Th2: Second threshold
θ: Yaw angle

What is claim is:

1. A vehicle comprising:
a lane keeping assistance system; and
a steering actuator which is a drive source of an automatic steering intervention function,
wherein a vehicle acceleration sensor is composed to detect an angular velocity at least of a yaw axis of a vehicle body and estimate an angle and an acceleration from the angular velocity,
wherein a steering controller processor controls the steering actuator based on at least one of the angular velocity detected by the vehicle acceleration sensor, a vehicle speed signal detected by a vehicle speed sensor, detection information detected by a camera device or a radar device,
wherein the steering processor divides a width of a same lane in which the vehicle travels into a plurality of virtual lanes based on the detection information from the camera device or the radar device, and controls the vehicle so that the vehicle travels in one virtual lane among the plurality of virtual lanes,
wherein the steering processor controls the steering actuator to control and controls the vehicle based on the angular velocity so that a change in a yaw angle decreases when the vehicle traveling in the one virtual lane changes the yaw angle with respect to a forward direction along the same lane by the steering actuator applying a steering torque, thereby returning the vehicle toward a center side in a width direction of a current virtual lane, and
wherein the steering processor controls the vehicle so that a lane is changed to a virtual lane that is in the same lane and adjacent to a change side of the yaw angle and increasing a lane width required for correcting a traveling direction according to a strength of a disturbance, with respect to a traveling virtual lane when a change speed of the yaw angle obtained by differentiating change amount of the yaw angle exceeds a first threshold due to a lateral disturbance affecting the vehicle.

2. The vehicle according to claim 1,
wherein the steering processor controls the vehicle so that a lane is changed to a second virtual lane adjacent to the change side of the yaw angle with respect to the traveling virtual lane when the change speed of the yaw angle exceeds a second threshold larger than the first threshold.

3. The vehicle according to claim 1,
wherein the steering processor controls the vehicle so that a traveling position of the vehicle is returned to an inside of the one virtual lane when the vehicle traveling in the one virtual lane is about to deviate from the inside of the one virtual lane.

4. The vehicle according to claim 1,
wherein a width of each of the plurality of virtual lanes is set to be uniform.

* * * * *